United States Patent
Yagi et al.

(10) Patent No.: US 11,104,607 B2
(45) Date of Patent: Aug. 31, 2021

(54) CRYSTALLIZED GLASS

(71) Applicant: OHARA INC., Kanagawa (JP)

(72) Inventors: Toshitaka Yagi, Kanagawa (JP); Yutaka Yamashita, Kanagawa (JP); Naoyuki Goto, Kanagawa (JP)

(73) Assignee: OHARA INC., Kanagawa (JP)

( * ) Notice: Subject to any disclaimer, the term of this patent is extended or adjusted under 35 U.S.C. 154(b) by 3 days.

(21) Appl. No.: 16/488,248

(22) PCT Filed: Dec. 28, 2017

(86) PCT No.: PCT/JP2017/047245
§ 371 (c)(1),
(2) Date: Aug. 23, 2019

(87) PCT Pub. No.: WO2018/154973
PCT Pub. Date: Aug. 30, 2018

(65) Prior Publication Data
US 2019/0375680 A1    Dec. 12, 2019

(30) Foreign Application Priority Data

Feb. 24, 2017   (JP) .............................. JP2017-032825

(51) Int. Cl.
*C03C 3/087* (2006.01)
*C03C 21/00* (2006.01)
*C03C 4/00* (2006.01)

(52) U.S. Cl.
CPC ............ *C03C 21/002* (2013.01); *C03C 3/087* (2013.01); *C03C 4/0092* (2013.01)

(58) Field of Classification Search
CPC ..... C03C 21/002; C03C 3/087; C03C 4/0092; C03C 10/0045
See application file for complete search history.

(56) References Cited

U.S. PATENT DOCUMENTS

| | | | |
|---|---|---|---|
| 7,589,038 B2* | 9/2009 | Goto | .................. C03C 10/0027 428/846.9 |
| 2004/0116268 A1 | 6/2004 | Kobayashi et al. | |
| 2008/0248316 A1* | 10/2008 | Goto | .................... G11B 5/7315 428/426 |
| 2016/0102010 A1* | 4/2016 | Beall | ..................... C03C 21/002 428/410 |

FOREIGN PATENT DOCUMENTS

| | | |
|---|---|---|
| JP | H08151228 A | 6/1996 |
| JP | 2014001094 A | 1/2014 |
| JP | 2014114200 A | 6/2014 |
| JP | 2017001937 A | 1/2017 |

OTHER PUBLICATIONS

Taiwan Patent Office, Office action dated Mar. 25, 2021.

* cited by examiner

*Primary Examiner* — Noah S Wiese
(74) *Attorney, Agent, or Firm* — Li & Cai Intellectual Property Office

(57) ABSTRACT

A crystallized glass includes a crystallized glass mother material, and, in a surface, a compressive stress layer, wherein the crystallized glass has, for a thickness of 10 mm, a light transmittance of, including reflection loss, 80% at a wavelength in 400 to 669 nm, and has a Vickers hardness [Hv] of 835 to 1300. In the crystallized glass, the crystallized glass mother material contains, in % by weight on an oxide basis, 40.0% to 70.0% of a $SiO_2$ component, 11.0% to 25.0% of an $Al_2O_3$ component, 5.0% to 19.0% of a $Na_2O$ component, 0% to 9.0% of a $K_2O$ component, 1.0% to 18.0% of a MgO component, 0% to 3.0% of a CaO component, and 0.5% to 12.0% of a $TiO_2$ component, and a total content of the $SiO_2$ component, the $Al_2O_3$ component, the $Na_2O$ component, the $K_2O$ component, the MgO component, and the $TiO_2$ component is 90% or more.

9 Claims, No Drawings

CRYSTALLIZED GLASS

FIELD OF THE DISCLOSURE

The present invention relates to a crystallized glass including, in a surface, a compressive stress layer. In particular, the present invention relates to a crystallized glass suitable for protective members for mobile electronic devices and optical devices, for example.

BACKGROUND OF THE DISCLOSURE

Mobile electronic devices such as smartphones and tablet PCs are equipped with cover glasses for protecting displays. Car-mounted optical devices are equipped with protectors for protecting lenses. Materials used for such cover glasses or protectors and having high visible-light transmittance and excellent color balance are in demand. In recent years, there has been an increasing demand for materials having higher hardness in applications to cover glasses or protectors for the purpose of enabling such devices to withstand harsher use.

As materials in applications to protective members, chemically strengthened glasses have been used. However, existing chemically strengthened glasses are very susceptible to cracks perpendicularly running from glass surfaces, so that mobile devices are often accidentally damaged due to dropping, which has been problematic.

Sapphire has been attracting attention as a material having higher hardness than glass and having transparency. However, sapphire is produced at low productivity and has low workability, compared with glass.

As another material, there is crystallized glass, which is produced by precipitating crystals within glass in order to increase the strength of glass. Crystallized glass can have better mechanical characteristics than amorphous glass. However, existing crystallized glass has low visible-light transmittance, and hence is not suitable in the applications to protective members.

Patent Literature 1 discloses a crystallized glass for data recording media. This crystallized glass has low visible-light transmittance. In addition, during chemical strengthening, a sufficient compressive stress value is not achieved, and a stress layer is not deeply formed.

CITATION LIST

Patent Literature

PTL 1: Japanese Unexamined Patent Application Publication No. 2014-114200

SUMMARY OF THE DISCLOSURE

In order to address such problems, the present invention has been made. An object of the present invention is to provide a crystallized glass having a high visible-light transmittance and a high hardness.

In order to achieve the object, the inventors of the present invention performed thorough tests and studies. As a result, the inventors have found the following findings: by specifying components constituting a crystallized glass and contents of the components and by adjusting crystallization conditions and chemical strengthening conditions, a very-hard and transparent crystallized glass is obtained. Thus, the inventors have completed the present invention. Specifically, the present invention provides the following.

Embodiment 1

A crystallized glass including a crystallized glass mother material, and, in a surface, a compressive stress layer, wherein the crystallized glass has, for a thickness of 10 mm, a light transmittance of, including reflection loss, 80% at a wavelength in 400 to 669 nm, and has a Vickers hardness [Hv] of 835 to 1300.

Embodiment 2

The crystallized glass according to Embodiment 1, wherein the compressive stress layer has a thickness of 20 µm or more.

Embodiment 3

The crystallized glass according to Embodiment 1 or 2, wherein the crystallized glass mother material contains, in % by weight on an oxide basis, 40.0% to 70.0% of a $SiO_2$ component,
11.0% to 25.0% of an $Al_2O_3$ component,
5.0% to 19.0% of a $Na_2O$ component,
0% to 9.0% of a $K_2O$ component,
1.0% to 18.0% of a MgO component,
0% to 3.0% of a CaO component, and
0.5% to 12.0% of a $TiO_2$ component, and
a total content of the $SiO_2$ component, the $Al_2O_3$ component, the $Na_2O$ component, the $K_2O$ component, the MgO component, and the $TiO_2$ component is 90% or more.

Embodiment 4

The crystallized glass according to any one of Embodiments 1 to 3, wherein the crystallized glass mother material contains, in % by weight on an oxide basis, 45.0% to 65.0% of a $SiO_2$ component,
13.0% to 23.0% of an $Al_2O_3$ component,
8.0% to 16.0% of a $Na_2O$ component,
1.0% to 7.0% of a $K_2O$ component,
2.0% to 15.0% of a MgO component,
0.1% to 2.0% of a CaO component,
1.0% to 10.0% of a $TiO_2$ component, and
0.1% to 2.0% of one or more selected from the group consisting of an $Sb_2O_3$ component, a $SnO_2$ component, and a $CeO_2$ component, and
a total content of the $SiO_2$ component, the $Al_2O_3$ component, the $Na_2O$ component, the $K_2O$ component, the MgO component, and the $TiO_2$ component is 90% or more.

Embodiment 5

The crystallized glass according to any one of Embodiments 1 to 4, wherein precipitated crystals have an average crystal size of 4 to 15 nm.

The present invention provides a crystallized glass having a high visible-light transmittance and a high hardness.

Crystallized glasses according to the present invention are usable as materials for optical members such as optical lenses. Such crystallized glasses are also usable for, because of their appearances unique to glass materials, outer-frame members of mobile electronic devices and other decorative applications.

DETAILED DESCRIPTION OF THE EXEMPLARY EMBODIMENTS

Description of Embodiments

Hereinafter, embodiments and Examples of a crystallized glass according to the present invention will be described in detail. However, the present invention is not limited to the following embodiments and Examples at all. The embodiments and Examples may be appropriately modified and practiced within the spirit and scope of the present invention.
[Crystallized Glass]

A crystallized glass according to the present invention includes a crystallized glass as a mother material (also referred to as a crystallized glass mother material), and, in the surface, a compressive stress layer. The compressive stress layer can be formed by subjecting the crystallized glass mother material to an ion-exchange treatment, and strengthens the crystallized glass mother material.

A crystallized glass according to the present invention has, for a thickness of 10 mm, a light transmittance (also simply referred to as transmittance) of, including reflection loss, 80% at a wavelength in 400 to 669 nm, preferably in 400 to 620 nm, more preferably in 400 to 600 nm. When the wavelength corresponding to the predetermined light transmittance satisfies such a range, high transparency and excellent color balance are achieved. The transmittance can be measured by a method described in EXAMPLES. Such a transmittance is affected by, for example, crystal grain size, amount of crystals, or a nucleating agent, and can be achieved by, in particular, adjusting crystallization temperature and crystallization time. With an increase in the crystallization temperature, the wavelength tends to increase.

The Vickers hardness [Hv] is 835 to 1300. The Vickers hardness is preferably 840 to 1300. The higher the hardness, the lower the probability of becoming scratched and cracked. The Vickers hardness can be measured by a method described in EXAMPLES. Such a hardness can be achieved by, in particular, adjusting chemical strengthening time and temperature in accordance with the thickness of the substrate.

The compressive stress layer of the crystallized glass preferably has a thickness of 20 μm or more. When the compressive stress layer has such a thickness, in case of appearance of a deep crack in the crystallized glass substrate, extension of the crack and breakage of the substrate can be suppressed. The thickness is more preferably 43 μm or more, most preferably 45 μm or more. The upper limit is not limited, but is normally 350 μm or less.

The surface of the compressive stress layer preferably has a compressive stress value of 850 MPa or more. With such a compressive stress value, extension of cracks can be suppressed and a higher mechanical strength can be provided. The compressive stress value is more preferably 950 MPa or more, still more preferably 1000 MPa or more, most preferably 1050 MPa or more. The upper limit is not limited, but is normally 1200 MPa or less.

In general, central stress CT (MPa) is expressed by the following formula with surface compressive stress represented by CS (MPa), substrate thickness represented by T (μm), and stress depth represented by t (μm).

$$CT = [CS \times t]/[T - 2t]$$

The larger the CS value and the larger the stress depth t, the larger the CT value. The larger CS and t, the higher the surface hardness and the Vickers hardness and the larger the CT value.

[Components Constituting Crystallized Glass]

The crystallized glass mother material constituting the crystallized glass is a material including a crystalline phase and a glass phase, and hence distinguished from amorphous solid. In general, the crystalline phase of crystallized glass is identified on the basis of the angles of peaks appearing in an X-ray diffraction pattern provided by X-ray diffraction analysis, and identified optionally by TEMEDX.

The crystallized glass contains, as a crystalline phase, for example, one or more selected from $MgAl_2O_4$, $MgTi_2O_5$, $MgTi_2O_4$, $Mg_2TiO_4$, $Mg_2SiO_4$, $MgAl_2Si_2O_8$, and $Mg_2Al_4Si_5O_{18}$.

The crystallized glass has an average crystal size of, for example, 4 to 15 nm, or 5 to 13 nm, or 6 to 10 nm. The average crystal size can be measured by a method described in EXAMPLES. The smaller the average crystal size, the smoother the processing to a post-polishing surface roughness Ra of several angstroms, and the higher the transmittance. The average crystal size can be adjusted by changing the composition or crystallization conditions.

Hereinafter, the composition ranges of components constituting the crystallized glass will be described. In this DESCRIPTION, the contents of components are described in % by weight on an oxide basis unless otherwise specified. The "oxide basis" means the following: assuming that the components constituting the crystallized glass are all decomposed into oxides, relative to the total weight of the oxides being defined as 100% by weight, the amounts of oxides of the components contained in the crystallized glass are described in % by weight.

The crystallized glass serving as the mother material (hereafter, also simply referred to as crystallized glass) preferably contains, in % by weight on an oxide basis,
  40.0% to 70.0% of a $SiO_2$ component,
  11.0% to 25.0% of an $Al_2O_3$ component,
  5.0% to 19.0% of a $Na_2O$ component,
  0% to 9.0% of a $K_2O$ component,
  1.0% to 18.0% of a MgO component,
  0% to 3.0% of a CaO component, and
  0.5% to 12.0% of a $TiO_2$ component.

The crystallized glass more preferably contains, in % by weight on an oxide basis,
  40.0% to 70.0% of a $SiO_2$ component,
  11.0% to 25.0% of an $Al_2O_3$ component,
  5.0% to 19.0% of a $Na_2O$ component,
  0.1% to 9.0% of a $K_2O$ component,
  1.0% to 18.0% of a MgO component,
  0.01% to 3.0% of a CaO component, and
  0.5% to 12.0% of a $TiO_2$ component.

The crystallized glass preferably further contains 0.01% to 3.0% of one or more selected from the group consisting of an $Sb_2O_3$ component, a $SnO_2$ component, and a $CeO_2$ component.

The $SiO_2$ component content is more preferably 45.0% to 65.0%, still more preferably 50.0% to 60.0%.

The $Al_2O_3$ component content is more preferably 13.0% to 23.0%.

The $Na_2O$ component content is more preferably 8.0% to 18.0%, more preferably 9.0% to 17.0%, particularly preferably 10.5% to 16.0%.

The $K_2O$ component content is more preferably 1.0% to 7.0%, still more preferably 1.0% to 5.0%.

The MgO component content is more preferably 2.0% to 15.0%, still more preferably 3.0% to 13.0%, particularly preferably 5.0% to 11.0%.

The CaO component content is more preferably 0.1% to 2.0%.

The $TiO_2$ component content is more preferably 1.0% to 10.0%, still more preferably 2.0% to 8.0%.

The total content of the $Sb_2O_3$ component, the $SnO_2$ component, and the $CeO_2$ component is more preferably 0.1% to 2.0%, still more preferably 0.3% to 1.0%.

The above-described content values can be appropriately combined.

The total content of the $SiO_2$ component, the $Al_2O_3$ component, the $Na_2O$ component, the $K_2O$ component, the MgO component, and the $TiO_2$ component may be 90% or more, preferably 95% or more, more preferably 98% or more, still more preferably 99% or more.

The total content of the $SiO_2$ component, the $Al_2O_3$ component, the $Na_2O$ component, the $K_2O$ component, the MgO component, the CaO component, the $TiO_2$ component, the $Sb_2O_3$ component, the $SnO_2$ component, and the $CeO_2$ component may be 90% or more, preferably 95% or more, more preferably 98% or more, still more preferably 99% or more. These components may account for 100%.

The crystallized glass may contain a ZnO component and a $ZrO_2$ component as long as advantages of the present invention are not degraded, or may not contain these components. The content may be 0 to 5.0%, 0 to 3.0%, or 0 to 2.0%. Addition of these components results in an increase in specific gravity.

The crystallized glass may contain a $B_2O_3$ component, a $P_2O_5$ component, a BaO component, an FeO component, a $Li_2O$ component, a SrO component, a $La_2O_3$ component, a $Y_2O_3$ component, a $Nb_2O_5$ component, a $Ta_2O_5$ component, a $WO_3$ component, a $TeO_2$ component, and a $Bi_2O_3$ component as long as advantages of the present invention are not degraded, or may not contain these components. The content of each component may be 0% or more and 2.0% or less, 0% or more and less than 2.0%, or 0% or more and 1.0% or less.

A crystallized glass according to the present invention may contain, as fining agents, in addition to the $Sb_2O_3$ component, the $SnO_2$ component, and the $CeO_2$ component, one or two or more selected from the group consisting of an $As_2O_3$ component, F, Cl, NOx, and SOx. However, the upper limit of the fining agent content is preferably 5.0%, more preferably 2.0%, most preferably 1.0%.

The crystallized glass serving as a mother material preferably contains, in mol % on an oxide basis, 43.0 mol % to 73.0 mol % of a $SiO_2$ component,
4.0 mol % to 18.0 mol % of an $Al_2O_3$ component,
5.0 mol % to 19.0 mol % of a $Na_2O$ component,
0.1 mol % to 9.0 mol % of a $K_2O$ component,
2.0 mol % to 22.0 mol % of a MgO component,
0.01 mol % to 3.0 mol % of a CaO component,
0.5 mol % to 11.0 mol % of a $TiO_2$ component, and
0.01 mol % to 3.0 mol % of one or more selected from the group consisting of an $Sb_2O_3$ component, a $SnO_2$ component, and a $CeO_2$ component.

The total content of the $SiO_2$ component, the $Al_2O_3$ component, the $Na_2O$ component, the $K_2O$ component, the MgO component, and the $TiO_2$ component may be 90 mol % or more, preferably 95 mol % or more, more preferably 98 mol % or more, still more preferably 99 mol % or more.

A molar ratio [$Al_2O_3$/MgO] expressed on an oxide basis may be 0.5 or more and 2.0 or less.

A molar ratio [$TiO_2$/$Na_2O$] expressed on an oxide basis may be 0 or more and 0.41 or less.

A molar ratio [MgO/$Na_2O$] expressed on an oxide basis may be 0 or more and 1.60 or less.

A crystallized glass according to the present invention may optionally contain other components not described above as long as characteristics of a crystallized glass according to the present invention are not degraded. However, transition metal components excluding Ti, Fe, Zr, Nb, W, La, Gd, Y, Yb, and Lu, such as V, Cr, Mn, Co, Ni, Cu, Ag, and Mo, are preferably substantially not contained because the glass becomes colored.

In addition, Pb, Th, Cd, Tl, Os, Be, and Se components are preferably substantially not contained because of a recent trend of reducing use of these hazardous chemical substances.

[Production Method]

A crystallized glass according to the present invention can be produced by the following method, for example. Raw materials are uniformly mixed such that the above-described components satisfy the predetermined content ranges, and melted and shaped to produce raw glass. Subsequently, this raw glass is crystallized to produce a crystallized glass mother material. Furthermore, the crystallized glass mother material is chemically strengthened.

The raw glass is heat-treated to precipitate crystals uniformly within the glass. This heat treatment may be performed at a 1-step temperature or 2-step temperatures.

In the 2-step heat treatment, a heat treatment at a first temperature is performed as a nucleation step; and, after this nucleation step, a heat treatment at a second temperature higher than in the nucleation step is performed as a crystal growth step.

In the 1-step heat treatment, at a 1-step temperature, a nucleation step and a crystal growth step are continuously performed. Generally, the temperature is increased to a predetermined heat treatment temperature; after the temperature reaches the heat treatment temperature, this temperature is held for a predetermined time, and subsequently the temperature is decreased.

The first temperature of the 2-step heat treatment is preferably 600° C. to 750° C. The holding time at the first temperature is preferably 30 minutes to 2000 minutes, most preferably 180 minutes to 1440 minutes.

The second temperature of the 2-step heat treatment is preferably 650° C. to 850° C. The holding time at the second temperature is preferably 30 minutes to 600 minutes, most preferably 60 minutes to 300 minutes.

When a heat treatment at a 1-step temperature is performed, the temperature of the heat treatment is preferably 600° C. to 800° C., more preferably 630° C. to 770° C. The holding time at the heat treatment temperature is preferably 30 minutes to 500 minutes, more preferably 60 minutes to 300 minutes.

The crystallized glass mother material can be processed by, for example, grinding and polishing, to produce a shaped body. The shaped body can be processed into a thin sheet, to thereby produce a thin-sheet crystallized glass mother material.

In the present invention, subsequently, in the crystallized glass mother material, a compressive stress layer is formed. The compressive stress layer is a strengthened layer formed by ion-exchange caused by a chemical strengthening process.

For example, the crystallized glass mother material can be chemically strengthened by bringing it into contact with or immersing it in a molten salt, for example, a salt containing potassium or sodium, such as potassium nitrate ($KNO_3$) or sodium nitrate ($NaNO_3$). Preferably, the crystallized glass mother material is immersed in molten salt prepared by heating potassium nitrate (KNO$_3$) at 350° C. to 600° C. (more preferably 400° C. to 500° C.) for 90 minutes or more, for example, 90 minutes to 60 hours, preferably 90 minutes to 50 hours. Thus, an ion-exchange reaction proceeds between a component present in the near-surface glass phase and a component contained in the molten salt. As a result, a compressive stress layer is formed in the surface portion. In the present invention, such immersion for a long period of time provides a hard crystallized glass.

EXAMPLES

Examples 1 to 29 and Comparative Example 1

As raw materials of the components of crystallized glasses, corresponding raw materials were selected, such as oxide, hydroxide, carbonate, nitrate, fluoride, chloride, hydroxide, and a metaphosphoric acid compound; and these raw materials are weighed so as to satisfy the following composition proportions and uniformly mixed.
(% by Weight on Oxide Basis)
SiO$_2$ component: 55%; Al$_2$O$_3$ component: 18%; Na$_2$O component: 12%; K$_2$O component: 2%; MgO component: 8%; CaO component: 1%; TiO$_2$ component: 5%; and Sb$_2$O$_3$ component: 0.1%

Subsequently, such a mixed raw material was charged into a platinum crucible and melted. Subsequently, the molten glass was stirred to be homogenized, then cast into a mold or the like, and slowly cooled to prepare raw glass.

The obtained raw glass was, in order to achieve nucleation and crystallization, subjected to a 1-step heat treatment to prepare a crystallized glass serving as a mother material. The heat treatment temperature was 660° C. to 740° C., and the holding time at the temperature was 5 hours.

The prepared crystallized glass mother material was cut and ground so as to have shapes having 40 mm sides and a thickness of more than 10 mm, and subjected to opposite-surface parallel polishing to provide 1-mm-thick and 10-mm-thick substrates.

The 1-mm-thick and 10-mm-thick crystallized glass mother materials were measured in terms of spectral transmittance in 240 to 800 nm by using a spectro photometer U-4000, manufactured by Hitachi High-Technologies Corporation, to determine a wavelength at which the transmittance including reflection loss became 80%. The results are described in Tables 1 and 2.

The crystalline phases of the crystallized glass mother materials were identified on the basis of the angles of peaks appearing in an X-ray diffraction pattern measured using an X-ray diffraction analyzer (X'PERT-PRO-MPD, manufactured by Philips), and identified optionally by TEMEDX (JEM 2100F, manufactured by JEOL Ltd.). Crystalline phases of MgAl$_2$O$_4$ and MgTi$_2$O$_4$ were identified.

In addition, the average crystal size of crystal grains precipitated in the crystallized glass mother materials was measured in images captured using a scanning electron microscope (TEM) (JEM 2100F, manufactured by JEOL Ltd.) at a magnification of 3,000,000. Specifically, the crystal sizes of crystal grains in a 180×180 nm$^2$ region were determined and averaged. The average crystal sizes are described in Tables 1 and 2.

The crystallized glass mother materials (substrates) subjected to opposite-surface parallel polishing to thicknesses described in Tables 1 and 2 were immersed in KNO$_3$ molten salt at salt bath temperatures for immersion times described in Tables 1 and 2 to achieve chemical strengthening to provide crystallized glasses. The crystallized glass of Example 1 was found to have a specific gravity of 2.54. The transmittance and the average crystal size were found to remain unchanged after the chemical strengthening.

The Vickers hardnesses (Hv) of crystallized glasses were determined and described in Tables 1 and 2. Such a Vickers hardness was determined in the following manner: a diamond quadrangular pyramid indenter having an angle of 136° between opposite faces was used to indent the test surface under a load to form a pyramid-shaped recess; this load was divided by a surface area (mm$^2$) calculated from the length of the recess, to determine a value as the Vickers hardness. The measurement was performed with a micro-hardness tester MVK-E, manufactured by Akashi Seisakusho, Ltd., under a test load of 100 gf, for a holding time of 15 seconds.

The thickness (stress thickness) (DOL) of the compressive stress layer of such a crystallized glass and the compressive stress value (CS) of the surface of the compressive stress layer were measured using a glass surface stress meter FSM-6000LE, manufactured by Orihara industrial co., ltd. Calculations were performed with a refractive index of 1.54 and an optical elastic constant of 29.658 [(nm/cm)/MPa] of the specimen. The central stress (CT) was determined using a formula of CT=CS×DOL/(T−DOL×2) (where T represents the thickness (μm) of the glass substrate). The results are described in Tables 1 and 2.

TABLE 1

| Example | 1 | 2 | 3 | 4 | 5 | 6 | 7 | 8 |
|---|---|---|---|---|---|---|---|---|
| Wavelength of 80% transmittance (nm) (1 mmt) | 356 | 356 | 356 | 356 | 356 | 356 | 356 | 356 |
| Wavelength of 80% transmittance (nm) (10 mmt) | 408 | 408 | 408 | 408 | 408 | 408 | 408 | 408 |
| Precipitated crystal grain size (average) (nm) | 6 | 6 | 6 | 6 | 6 | 6 | 6 | 6 |
| Strengthening salt | KNO3 | KNO3 | KNO3 | KNO3 | KNO3 | KNO3 | KNO3 | KNO3 |
| Salt bath temperature (° C.) | 450 | 450 | 450 | 450 | 450 | 450 | 450 | 450 |
| Immersion time (min) | 90 | 120 | 180 | 300 | 480 | 180 | 180 | 300 |
| Thickness of crystallized glass substrate | 1.0 | 1.0 | 1.0 | 1.0 | 1.0 | 0.1 | 0.2 | 0.5 |

TABLE 1-continued

| (mm) | | | | | | | | |
|---|---|---|---|---|---|---|---|---|
| Hv (100 gf) | 880 | 900 | 930 | 960 | 970 | 860 | 870 | 900 |
| CS (MPa) | 1050 | 1050 | 1045 | 1044 | 1046 | 950 | 1020 | 1050 |
| DOL (μm) | 26 | 37 | 42 | 55 | 68 | 22 | 28 | 38 |
| CT (MPa) | 29 | 42 | 48 | 65 | 82 | 373 | 198 | 94 |

| Example | 9 | 10 | 11 | 12 | 13 | 14 | 15 | 16 |
|---|---|---|---|---|---|---|---|---|
| Wavelength of 80% transmittance (nm) (1 mmt) | 356 | 356 | 356 | 356 | 356 | 356 | 356 | 356 |
| Wavelength of 80% transmittance (nm) (10 mmt) | 408 | 408 | 408 | 408 | 408 | 408 | 408 | 408 |
| Precipitated crystal grain size (average) (nm) | 6 | 6 | 6 | 6 | 6 | 6 | 6 | 6 |
| Strengthening salt | KNO3 | KNO3 | KNO3 | KNO3 | KNO3 | KNO3 | KNO3 | KNO3 |
| Salt bath temperature (° C.) | 500 | 450 | 430 | 450 | 440 | 390 | 450 | 500 |
| Immersion time (min) | 500 | 500 | 500 | 500 | 500 | 500 | 240 | 500 |
| Thickness of crystallized glass substrate (mm) | 0.5 | 0.65 | 0.65 | 0.8 | 0.8 | 1.0 | 1.0 | 1.0 |
| Hv (100 gf) | 1030 | 930 | 920 | 940 | 930 | 950 | 960 | 880 |
| CS (MPa) | 900 | 1020 | 1020 | 1050 | 1050 | 1060 | 1100 | 1010 |
| DOL (μm) | 110 | 55 | 43 | 58 | 50 | 30 | 61 | 110 |
| CT (MPa) | 354 | 104 | 78 | 89 | 75 | 34 | 76 | 142 |

TABLE 2

| Example | 17 | 18 | 19 | 20 | 21 | 22 | 23 | 24 | 25 | 26 | 27 | 28 | 29 | Comparative Example 1 |
|---|---|---|---|---|---|---|---|---|---|---|---|---|---|---|
| Wavelength of 80% transmittance (nm) (1 mmt) | 356 | 356 | 356 | 356 | 356 | 356 | 356 | 358 | 358 | 359 | 359 | 391 | 391 | 358 |
| Wavelength of 80% transmittance (nm) (10 mmt) | 408 | 408 | 408 | 408 | 408 | 408 | 408 | 592 | 592 | 612 | 612 | 668 | 668 | 610 |
| Precipitated crystal grain size (average) (nm) | 6 | 6 | 6 | 6 | 6 | 6 | 6 | 6 | 6 | 9 | 9 | 12 | 12 | 6 |
| Strengthening salt | KNO3 | KNO3 | KNO3 | KNO3 | KNO3 | KNO3 | KNO3 | KNO3 | KNO3 | KNO3 | KNO3 | KNO3 | KNO3 | KNO3 |
| Salt bath temperature (° C.) | 450 | 450 | 450 | 500 | 500 | 500 | 550 | 450 | 450 | 450 | 450 | 450 | 450 | 450 |
| Immersion time (min) | 720 | 1000 | 2400 | 720 | 1440 | 2880 | 500 | 500 | 2880 | 500 | 2880 | 500 | 2880 | 60 |
| Thickness of crystallized glass substrate (mm) | 1.2 | 4.0 | 4.0 | 5.0 | 5.0 | 4.0 | 4.0 | 1.0 | 5.0 | 1.0 | 5.0 | 1.0 | 5.0 | 1.0 |
| Hv (100 gf) | 1040 | 1060 | 1180 | 1120 | 1120 | 1200 | 1180 | 960 | 1220 | 970 | 1240 | 1010 | 1270 | 730 |
| CS (MPa) | 1020 | 1080 | 1050 | 1100 | 1120 | 1080 | 1050 | 1050 | 1060 | 1050 | 1080 | 1050 | 1080 | 1205 |
| DOL (μm) | 78 | 70 | 180 | 110 | 180 | 280 | 240 | 57 | 280 | 58 | 290 | 60 | 300 | 16 |
| CT (MPa) | 76 | 20 | 52 | 25 | 43 | 88 | 72 | 68 | 67 | 69 | 71 | 72 | 74 | 20 |

Several embodiments and/or Examples according to the present invention have been described in detail. However, those skilled in the art would easily modify, in various ways, such embodiments and/or Examples serving as examples without substantially departing from the novel teachings and advantages according to the present invention. Thus, such various modifications fall in the scope of the present invention.

The contents of the document described in this DESCRIPTION and the Description of the Japanese Patent Application to which the present application claims a Paris Convention priority are incorporated herein by reference in their entirety.

What is claimed is:

1. A crystallized glass comprising a crystallized glass mother material, and, in a surface, a compressive stress layer,
wherein the crystallized glass has, for a thickness of 10 mm, a light transmittance of, including reflection loss, 80% at a wavelength in 400 to 669 nm, and has a Vickers hardness [Hv] of 835 to 1300;
wherein the crystallized glass mother material contains, in % by weight on an oxide basis, 40.0% to 70.0% of a $SiO_2$ component,
11.0% to 25.0% of an $Al_2O_3$ component,
8.0% to 19.0% of a $Na_2O$ component,
0% to 9.0% of a $K_2O$ component,
1.0% to 18.0% of a MgO component,
0% to 3.0% of a CaO component, and
0.5% to 12.0% of a $TiO_2$ component;
wherein, a total content of the $SiO_2$ component, the $Al_2O_3$ component, the $Na_2O$ component, the $K_2O$ component, the MgO component, and the $TiO_2$ component is 90% or more.

2. The crystallized glass according to claim 1, wherein the compressive stress layer has a thickness of 20 μm or more.

3. The crystallized glass according to claim 1, wherein precipitated crystals have an average crystal size of 4 to 15 nm.

4. A crystallized glass comprising a crystallized glass mother material, and, in a surface, a compressive stress layer;
wherein the crystallized glass has, for a thickness of 10 mm, a light transmittance of, including reflection loss, 80% at a wavelength in 400 to 669 nm, and has a Vickers hardness [Hv] of 835 to 1300;
wherein the crystallized glass mother material contains, in % by weight on an oxide basis,
45.0% to 65.0% of a $SiO_2$ component,
13.0% to 23.0% of an $Al_2O_3$ component,
8.0% to 16.0% of a $Na_2O$ component,
1.0% to 7.0% of a $K_2O$ component,
2.0% to 15.0% of a MgO component,
0.1% to 2.0% of a CaO component,
1.0% to 10.0% of a $TiO_2$ component, and
0.1% to 2.0% of one or more selected from the group consisting of an $Sb_2O_3$ component, a $SnO_2$ component, and a CeO2 component;
wherein, a total content of the $SiO_2$ component, the $Al_2O_3$ component, the $Na_2O$ component, the $K_2O$ component, the MgO component, and the $TiO_2$ component is 90% or more.

5. The crystallized glass according to claim 4, wherein the compressive stress layer has a thickness of 20 μm or more.

6. The crystallized glass according to claim 4, wherein precipitated crystals have an average crystal size of 4 to 15 nm.

7. A crystallized glass comprising a crystallized glass mother material, and, in a surface, a compressive stress layer;
wherein the crystallized glass has, for a thickness of 10 mm, a light transmittance of, including reflection loss, 80% at a wavelength in 400 to 669 nm, and has a Vickers hardness [Hv] of 835 to 1300;
wherein the crystallized glass mother material contains, in % by weight on an oxide basis,
40.0% to 70.0% of a $SiO_2$ component,
11.0% to 25.0% of an $Al_2O_3$ component,
5.0% to 19.0% of a $Na_2O$ component,
0% to 9.0% of a $K_2O$ component,
1.0% to 18.0% of a MgO component,
0% to 3.0% of a CaO component,
0.5% to 12.0% of a $TiO_2$ component, and
0% to 2.0% of a $Li_2O$ component;
wherein, a total content of the $SiO_2$ component, the $Al_2O_3$ component, the $Na_2O$ component, the $K_2O$ component, the MgO component, and the $TiO_2$ component is 90% or more.

8. The crystallized glass according to claim 7, wherein the compressive stress layer has a thickness of 20 μm or more.

9. The crystallized glass according to claim 7, wherein precipitated crystals have an average crystal size of 4 to 15 nm.

* * * * *